United States Patent [19]

Sweet

[11] Patent Number: 4,978,454
[45] Date of Patent: Dec. 18, 1990

[54] MEMBRANE ASSISTED SETTLING PROCESS

[75] Inventor: James R. Sweet, Clearwater, Canada

[73] Assignee: Exxon Research and Engineering Company, Florham Park, N.J.

[21] Appl. No.: 434,735

[22] Filed: Nov. 13, 1989

[51] Int. Cl.$^5$ .............................................. B01D 61/58
[52] U.S. Cl. ..................................... 210/640; 210/634; 210/650; 210/651; 210/652; 210/644
[58] Field of Search .............. 210/634, 644, 649, 650, 210/652, 708, 799, 804, 806, 640, 651

[56] References Cited

U.S. PATENT DOCUMENTS

| | | | |
|---|---|---|---|
| 2,232,722 | 2/1941 | Parkhurst | 196/13 |
| 2,754,249 | 7/1956 | Myers et al. | 196/14.15 |
| 3,725,257 | 4/1973 | Cavenaghi et al. | 208/331 |
| 3,917,526 | 11/1975 | Jennings | 210/23 |
| 3,985,644 | 10/1976 | Eberly | 208/321 |
| 4,391,711 | 7/1983 | Jackson et al. | 210/634 |
| 4,426,293 | 1/1984 | Mason et al. | 210/636 |
| 4,432,866 | 2/1984 | West et al. | 208/321 |

FOREIGN PATENT DOCUMENTS

| | | |
|---|---|---|
| 080684 | 6/1983 | European Pat. Off. . |
| 2425876 | 1/1980 | France . |
| 1456304 | 11/1976 | United Kingdom . |

OTHER PUBLICATIONS

"Oily Bilge Water Treatment with a Tubular Ultrafiltration System" Harris, et al., Journal of Engineering for Industry, Nov. 1976, pp. 1215-1220.

Primary Examiner—Frank Spear
Assistant Examiner—Krisanne Shideler
Attorney, Agent, or Firm—Joseph J. Allocca

[57] ABSTRACT

A method for separating mixtures into a first fraction and a second fraction employing a combination of settling, ultrafiltration and permeate/retentate recycle to the settling zone is disclosed. A multi component feed stream is fed to a settling zone wherein it is permitted to separate into two major phases. At the interface of these two phases is an intermediate zone which is relatively equal in concentration of the component in the feed. A slip stream is drawn from the settling zone at this intermediate zone and fed to a membrane separation unit wherein the slip stream is separated into a retentate enriched in one component and a permeate enriched in the other component. The retentate is fed back to the settling zone to an area therein which has a high concentration of the component present in the retentate. The permeate is fed to the settling zone to an area therein which has a high concentration of the component present in the permeate. Two streams are recovered from the settling zone, a bottoms stream rich in one component and a top stream rich in a second component.

12 Claims, 1 Drawing Sheet

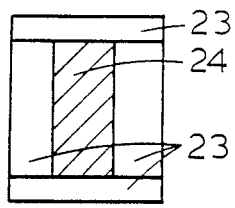
FIG. 8.1
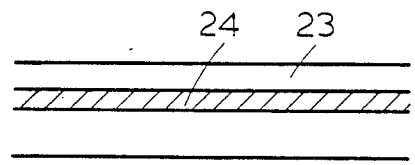
FIG. 8.2
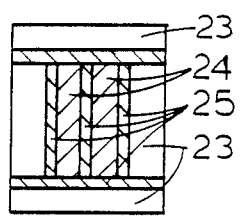
FIG. 10.1
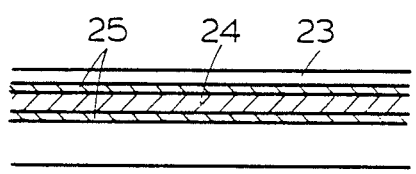
FIG. 10.2
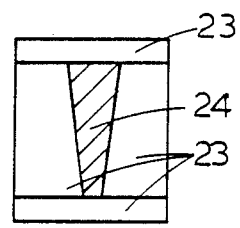
FIG. 9.1
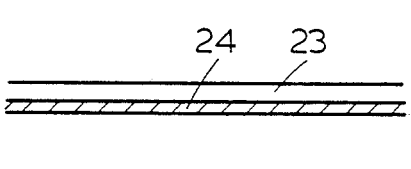
FIG. 9.2

FIG.11.1
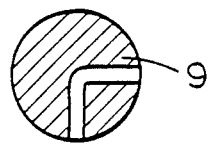
FIG.11.2
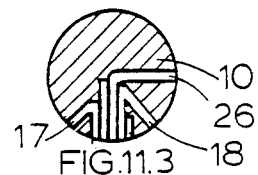
FIG.11.3
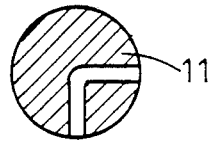
FIG.11.4
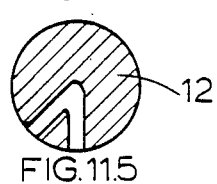
FIG.11.5
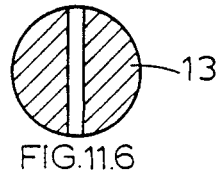
FIG.11.6

MEMBRANE ASSISTED SETTLING PROCESS

BRIEF DESCRIPTION OF THE INVENTION

The present invention is directed to a method for separating a mixture containing two dispersed phases. The two phases can be a liquid-solid mixture or an immiscible liquid-liquid mixture. The mixture is present in a settling zone, for example, within a settling vessel, a centrifuge, a liquid-liquid extraction tower or similar device. Within the settling zone, the mixture partially separates into a lower phase and an upper phase. An intermediate zone is also present within the settling zone at which there is still present a dispersed mixture of the two phases. A slip stream is withdrawn from the settling zone from this intermediate dispersed mixture area and fed to a membrane separation unit which produces a retentate rich in one phase and a permeate rich in the other phase. The retentate is fed back to the settling zone at a location above or below the aforesaid intermediate zone, said feedback location being that at which the phase composition of the retentate matches the phase composition present in the settling zone. Similarly the permeate is fed back to the settling zone at a location above or below the aforesaid intermediate zone, said feed back location being that at which the phase composition of the permeate matches the phase composition present in the settling zone. A bottoms fraction rich in one phase is finally withdrawn from the settling zone and a top stream rich in the second phase is withdrawn from the settling zone. These separate top stream and bottoms stream are sent for further processing or used or otherwise recycled to the processes, which initially produced the mixed two phase stream. In the case of an extraction tower, the separate raffinate solution and/or extract solution phases recovered from the tower can themselves be fed to a separate settler zone for further separation, with the intermediate fraction from that settler being itself sent to a membrane separation unit for separation into a permeate and retentate, treated as described above.

BACKGROUND OF THE INVENTION

The separation of mixtures containing multiple components which, because of solubility, density or some other characteristic can separate into distinct phases, is a process of importance to industry. Such two phase mixtures can result from a number of processes.

In the production of crude oil, water/oil emulsions are produced. These two phase liquid-liquid mixtures can comprise simply water and oil or surfactants (both naturally occurring as well as deliberately added) can be present. The two phase mixture must be separated to recover the valuable oil product.

Dewaxing of lube oils and other petroleum streams can be accomplished by crystallization of the wax with or without a solvent. This results in formation of a two phase liquid(oil)-solid(wax) mixture which must be separated to recover the oil and wax products. Even after this primary two phase mixture separation, additional dispersed two phase mixtures can result from subsequent processing of each of the initially separated phases. For example U.S. Pat. No. 2,232,722 is directed at a dewaxing process in which the single phase dewaxed oil solution, resulting from a prior two phase wax/oil separation, is chilled to promote phase separation Additional solvent may be added to the solution to facilitate the phase separation.

A traditional method for separation of solid-liquid mixtures and for separation of two phase immiscible liquid-liquid mixtures is by gravity or "gravity-enhanced" (e.g. centrifuges) settling. A typical settler is an enlarged vessel with or without baffles which creates the settling zone, thus providing the residence time required for the gravity induced separation of a two phase system. The heavier liquid or solid phase settles to the bottom and the lighter phase rises to the top but within the settler there is an intermediate zone at which there is still present a dispersed mixture of the two phases. The process of settling may be carried out batchwise or continuously.

Settlers can provide excellent separation of two phase mixtures with near complete recovery of each phase in a high state of purity. However, limitations occur with certain two phase systems when only very small density differences exist between the two phases and/or there is stabilization of the dispersed phase. Such systems require very long settling times and can result in prohibitively large settling vessels for continuous operation One example of such a hard-to-settle two phase system would be a solids in liquid suspension in which the particle size of the solids is very small and/or the density of the solids is near that of the liquid as might occur in a petroleum dewaxing process. Another example would be a finely dispersed, surfactant stabilized liquid-liquid micro-emulsion, as occur in water/oil emulsions in which surfactants are present, such as are encountered in crude oil production.

Another example of two phase mixtures which require separation occurs in the production of lube oil or other petrochemical feedstocks, by liquid-liquid extraction processing. Liquid-liquid extraction in either a batchwise or continuous co-current or countercurrent mode is used to separate petroleum molecules, for example, to separate undesired aromatic compounds from distillates to increase lube oil quality and to separate highly valued molecules such as benzene, toluene, xylene for chemicals production. In the liquid-liquid extraction process, the feed stream is contacted with a suitable solvent, for example, phenol, furfural, acetone or N-methyl pyrrolidone, resulting in the formation of a dispersed two phase liquid-liquid mixture, these being the raffinate solution and the extract solution, within the extraction tower. The raffinate solution and extract solution are withdrawn separately from the extraction tower as the main products but within the tower there exists an intermediate zone functioning as a settling zone in which is present a dispersed mixture of extract solution/raffinate solution.

Previously, efforts have been directed at the subsequent processing of the extract and raffinate solutions from the extraction tower to separate and recover the solvent, as well as to further purify the lube oil base, which typically comprises the raffinate. These subsequent processing steps also encounter dispersed two phase mixture which must be separated.

U.S. Pat. Nos. 3,725,257 and 3,985,644 are both directed at the extractive separation of an aromatic-rich stream from a petroleum fraction. The extract solution from the extraction tower is cooled which results in the formation of an aromatic-rich hydrocarbon phase and a solvent-rich phase. The solvent-rich phase is recovered and recycled either to an intermediate point or to the top of the extractor while the hydrocarbon-rich phase is passed to a distillation zone. This process is deficient in that the solvent returned to the extractor contains significant quantities of aromatic hydrocarbons. Thus, recycling this recovered solvent to the top of the extractor will require significantly more solvent for effective removal of aromatics from the aromatic-containing feedstock.

U.S. Pat. No. 2,754,249 also discloses the extraction of a hydrocarbon fraction to remove non-paraffinic compounds. The extract is de-oiled by the addition of an anti-solvent capable of reducing the solubility of the extracted hydrocarbons in the solvent. This results in the formation of a dispersed two phase mixture which must be separated so that the hydrocarbon phase can be recovered and the phase containing solvent and anti-solvent passed on to a distillation zone to recover the solvent and anti-solvent streams. The solvent, substantially devoid of anti-solvent, then is mixed with solvent recovered from the raffinate phase and recycled to the extraction system. This process depends upon the use of large amounts of anti-solvent to effect the required separation. Thus, the solvent-rich phase must be distilled to remove large quantities of anti-solvent, resulting in this process being energy intensive.

An alternative technology to settling, particularly useful for hard-to-settle two phase systems, is membrane separation. Microfiltration or ultrafiltration membranes can effectively separate two phase solid-liquid and immiscible liquid-liquid mixtures. The membrane provides a physical barrier to passage of the dispersed liquid or solid phase while the continuous liquid phase is permeated through the membrane under a pressure gradient.

Such a membrane process can recover some portion of the continuous phase with very high purity but is generally limited to relatively low less than 50%, recovery levels. As a result the dispersed phase, the retentate, from the membrane process will still contain large amounts of the continuous phase.

In practice, membrane and settling technology can be and occasionally are used together in a combination process. Membrane processing can be used to concentrate a two phase mixture to a small volume retentate which then requires a relatively smaller settler for subsequent treatment.

The sequence can also be reversed

U.S. Pat. No. 4,432,866 is directed to a method for separating a mixture into a first fraction and a second fraction. The method comprises passing the mixture into a settling/decantation zone where the solution is separated into a first fraction relatively rich in a first component and a second fraction relatively deficient on the first component. One of the separated fractions subsequently is passed to a membrane separation zone for further processing, and separation to produce a retentate stream further enriched in one or the other component (as the case may be) and a permeate further depleted in that component. The permeate or retentate, as appropriate is recycled to the initial processes (i.e. dewaxing, extraction etc.) which produced the initial mixture separated by the process. An anti-solvent can be added to the initial mixture to facilitate separation in the decantation/settling zone. In addition to or in place of the anti-solvent, the mixture can be chilled to induce phase separation.

GB 1,456,304 teaches a process for treating waste aqueous streams. A waste water stream is sent to a surge tank wherein solids are separated out of the stream. A fraction of the waste water is withdrawn from the surge tank and sent to an ultrafiltration unit wherein an oil fraction is recovered and a water fraction is recovered. In one embodiment a residual emulsion further separated from the recovered oil phase is cycled back to the ultrafiltration unit for additional processing.

"Oily Bilge Water Treatment With a Tubular Ultrafiltration System" Harris et al. Journal of Engineering for Industry, November 1976 pg 1215–1220 describes a system wherein oily bilge water is sent to a settler and the bottoms phase (the water phase) is sent to an ultrafiltration unit to further separate residual oil from the water, thereby producing a retentate containing the residual oil and a permeate constituting oil free water. From the diagram in the article it is seen that the permeate and retentate either combined or separately could be returned to the top of the settling tank.

SUMMARY OF THE INVENTION

Figure 1:
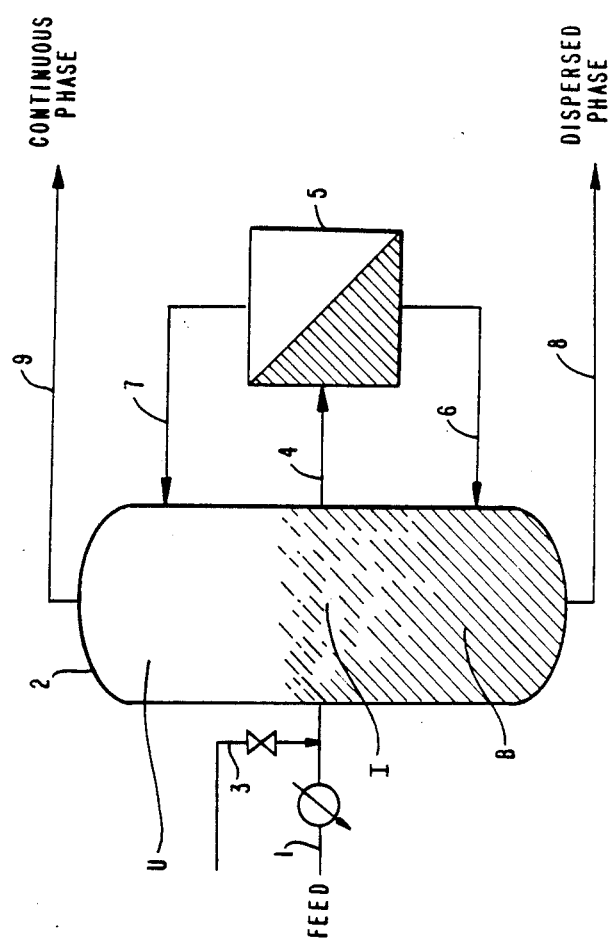
FIG. 1 is a schematic of one embodiment of the process of the present invention.

The present invention is a process for separating two phase mixtures. The mixture containing two phase solid-liquid or dispersed immiscible liquid-liquid mixtures is separated by a procedure wherein the mixture containing the phase separable components is fed to a settling zone. The settling zone can be either a gravity settler or it can be a gravity assisted separator, e.g. a centrifuge. Alternatively the mixture to be separated can be generated in a liquid-liquid counter current extraction tower, whereby the settling zone occurs within the tower. From such a tower an upper fraction is recovered and a bottom fraction is recovered, commonly referred to as raffinate solution and extract solution. Within the settling zone of such an extraction tower, between the extreme ends at which the raffinate solution and extract solution are recovered is an intermediate zone containing a mixed immiscible phase of extract solution/raffinate solution.

In the settling zone a pre-existing mixture separates into an upper phase and a bottom phase. In both the settler and extraction tower examples, at the interface of the distinct phases is an intermediate zone which is characterized by having present therein significant quantities of the constituents of both the upper light phase and the bottoms heavier phase. In the case of the settler, the intermediate zone material is similar in composition to the initial feed before phase separation occurs. A stream of the intermediate zone mixture is fed to a membrane separation unit. The membrane unit is run under conditions appropriate for the feed mixture to be separated. Thus, the conditions of operation can be dialysis, reverse osmosis, ultra-filtration, microfiltration, pervaporation or perstraction, as appropriate. Membranes which can be used are any solid ceramic, sintered metal or polymeric membranes which exhibit selectivity for one component of the mixture over other components of the mixture. Thus membranes made of regenerated cellulose, cellulose ester, cellulose ethers, mixtures of cellulose esters and ethers, polyimide, polysulfone, polyurea, polyurethane, polyurea/urethane, ceramics such as alumina etc. can be used. The process can be utilized, for example, as part of the separation of aromatics extraction solvents, such as NMP, from extract or raffinate phases in the reverse osmosis process described in U.S. Pat. No. 4,510,047 which uses regenerated cellulose as the membrane or in the separation of organic liquids, especially for the recovery of dewaxing solvent from dewaxed oil under reverse osmosis conditions as described in U.S. Pat. No. 4,532,041 which uses polyimide membranes. It can also be used to separate the raffinate solution phase from the extract solution phase produced in the intermediate zone of the extraction tower itself.

In the membrane unit the intermediate zone mixture is separated into a retentate enriched in either the lighter phase component or the heavy phase component while the permeate is enriched in the complimentary component, i.e. the heavier phase component or the lighter phase component of the mixture. The retentate is fed back to the settling zone or extraction tower at a location above or below the aforesaid intermediate zone, said feed back location being that at which the composition of the retentate matches the phase composition present in the settling zone or extraction tower; while the permeate is fed back to the settling zone or extraction tower at a location above or below the aforesaid intermediate zone, said permeate feed back location being that at which the phase composition of the permeate matches the phase composition present in the settling zone or extraction tower. A bottoms fraction rich in one phase is finally withdrawn from the settler or extraction tower and a top stream rich in the second phase is withdrawn from the settler or extraction tower. These separated top stream and bottoms stream are sent for further processing or used as such or otherwise recycled to the process which initially produced the mixed two phase stream sent to the settler, i.e., returned to the extraction or dewaxing process or recycled as drilling fluid to crude oil production, etc. For the sake of simplicity, in the balance of this specification, it is presumed that the retentate is the heavier dispersed (non-continuous) phase (liquid or solid) component while the permeate is the lighter (continuous) phase component.

Thus, following membrane separation the retentate, heavy phase, is fed back to the settling zone or extraction tower and introduced back into the zone or tower at a point below the intermediate zone from which the feed to the membrane unit has been withdrawn. At the point of reintroduction the composition of the retentate matches the composition of the bottoms, heavy phase. Similarly, the permeate, light phase, is recycled to the settling zone or extraction tower and introduced back into the zone or tower at a point above the intermediate zone from which the feed to the membrane unit has been withdrawn. At the point of reintroduction the composition of the permeate matches the composition of the upper, light phase.

Referring to FIG. 1 a preformed two phase mixture, for example, an oil/water emulsion or a wax/oil suspension, or a single phase precursor stream of a two phase mixture, for example the extraction solution or raffinate solution from an aromatics extraction process is fed via line (1) to settler (2). In the case of an already formed two phase mixture, the feed stream can optionally be cooled prior to introduction into the settler so as to facilitate phase separation. Alternatively a quantity of anti-solvent can be added via line (3) which upsets any equilibrium which may exist in the stream and also facilitate phase separation. In the case of a single phase which is the precursor stream of a dispersed two phase mixture, prior cooling or anti-solvent addition or some other step would be required to induce phase separation such that a dispersed two phase mixture results and passes to the settler (2).

Referring again to FIG. 1, in the case where the process is used to separate the immiscible two phase mixture of extract solution and raffinate solution formed within a liquid-liquid extraction tower resulting from contacting of a hydrocarbon feed with a suitable solvent, for example phenol, furfural, acetone or N-methyl pyrrolidone, the settler (2) would represent the settling zone within the extraction tower.

Within settler (2) or the settling zone represented by settler (2), the two phase feed undergoes separation into a heavy bottoms phase (B) and a lighter upper phase (u). Between these 2 distinct phases, however, is an intermediate mixed phase (I) containing constituents of both the upper light phase and heavy bottoms phase. A stream is withdrawn from settler (2) at this intermediate zone (I) and fed via line (4) to membrane separation unit (5). In that unit the intermediate zone stream is separated into, for the purposes of this example, a retentate rich in the heavy bottoms phase/dispersed phase and a permeate rich in the light upper phase/continuous phase. The retentate is cycled back to the settler (2) via line (6). The retentate is introduced into settler (2) at a point below that at which the intermediate mixed phase was withdrawn via line (4). The permeate is introduced into settler (2) via line (7) at a point higher than that at which the intermediate mixed phase was withdrawn via line (4).

The membrane-settling process described herein has advantages over that of either settlers or membranes alone or a combined membrane-settler process operated in series. By assisting the gravity-only separation of the settler portion, the overall residence time required for separation will be reduced which will in turn reduce the size/cost of the settler required. The new process is applicable to both readily settling and hard-to-settle two phase mixtures and also provides for high recoveries of the two phases with high purity.

As a final step a high purity bottoms phase can be withdrawn from settler (2) via line (8) and sent on for further processing or recycled to the original process which produced the two phase mixture initially introduced into the settler. Similarly a high purity upper phase can be withdrawn from settler (2) via line (9) and also sent for further processing or recycled to the original process.

What is claimed is:

1. A method for separating a mixture of two dispersed phases into separate streams the method comprising feeding the mixture into a settling zone wherein the mixture separates into a lower phase, an upper phase and an intermediate mixed phase having components of both the lower phase and upper phase present therein, withdrawing a stream from the settling zone of this intermediate mixed phase and feeding said intermediate mixed phase stream to a membrane separation unit to produce a retentate rich in one phase and a permeate rich in the other phase, withdrawing the retentate from the membrane unit and feeding it back to the settling zone at a feed back location above or below the point at which the stream of intermediate mixed phase fed to the membrane unit was initially withdrawn, said feed back location being that at which the composition of the retentate matches the phase composition present in the settling zone, withdrawing the permeate from the membrane unit and feeding it back to the settling zone at a feed back location below or above the point at which the stream of intermediate mixed phase fed to the membrane unit was initially withdrawn, said feed back location being that at which the composition of the permeate matches the phase composition present in the settling zone, withdrawing a bottoms fraction rich in one phase from the settler zone and withdrawing a tops fraction stream rich in the other phase from the settler zone and sending these separate bottoms fraction and tops fraction to further processing or recycle as appropriate.

2. A method for enhancing the separation of a mixture of two dispersed phases in a liquid-liquid extraction tower into separate streams the method comprising withdrawing a stream of mixed raffinate-fraction solution/extract solution from an intermediate zone of the extraction tower and feeding said raffinate solution/extract solution mixed phase stream to a membrane separation unit to produce a retentate rich in one phase and a permeate rich in the other phase, withdrawing the retentate from the membrane unit and feeding it back to the extraction tower at a feed back location above or below the point at which the mixed phase stream was initially withdrawn, said feed back location being that at which the composition of the retentate matches the phase composition present in the extraction tower, withdrawing the permeate from the membrane unit and feeding it back to the extraction tower at a feed back location below or above the point at which the mixed phase stream was initially withdrawn, said feed back location being that at which the composition of the permeate matches the phase composition present in the extraction tower, withdrawing a bottoms fraction rich in one phase from the extraction tower and withdrawing a tops fraction rich in the other phase from the extraction tower and sending these separate bottoms and tops fractions to further processing or recycle as appropriate.

3. The method of claim 1 or 2 wherein the mixture of two dispersed phases is an immiscible liquid-liquid mixture.

4. The method of claim 1 wherein the mixture of two dispersed phases is a solid-liquids mixture.

5. The method of claim 1 wherein the settling zone is a gravity settler or a gravity assisted settler.

6. The method of claim 1 or 2 wherein the two dispersed phases are separated into a heavy phase retentate and a light phase permeate.

7. The method of claim 1 or 2 wherein the two dispersed phases are separated into a light phase retentate and a heavy phase permeate.

8. The method of claim 1 or 2 wherein the membrane unit is operated under dialysis, reverse osmosis, ultrafiltration, microfiltration, pervaporation or perstraction conditions.

9. The method of claim 1 wherein the feed to the settling zone is cooled prior to introduction to the settling zone so as to facilitate phase separation.

10. The method of claim 1 wherein an anti-solvent is added to the feed sent to the settling zone prior to introduction to the settling zone so as to facilitate phase separation.

11. The method of claim 2 or 3 wherein the mixture of two dispersed phases comprising an immiscible liquid-liquid mixture is selected from solvent extraction raffinate-solvent mixture, solvent extraction extract-solvent mixture mixed raffinate-solvent/extract-solvent mixture or dewaxing solvent/dewaxed oil mixture from a dewaxing process.

12. The method of claim 3 wherein the mixture of two dispersed phases comprising an immiscible liquid-liquid mixture is selected from solvent extraction raffinate-solvent mixture, solvent extraction extract-solvent mixture, mixed raffinate-solvent/extract-solvent mixture or dewaxing solvent/dewaxed oil mixture from a dewaxing process.

* * * * *